INVENTOR
HORACE L. SMITH, JR.

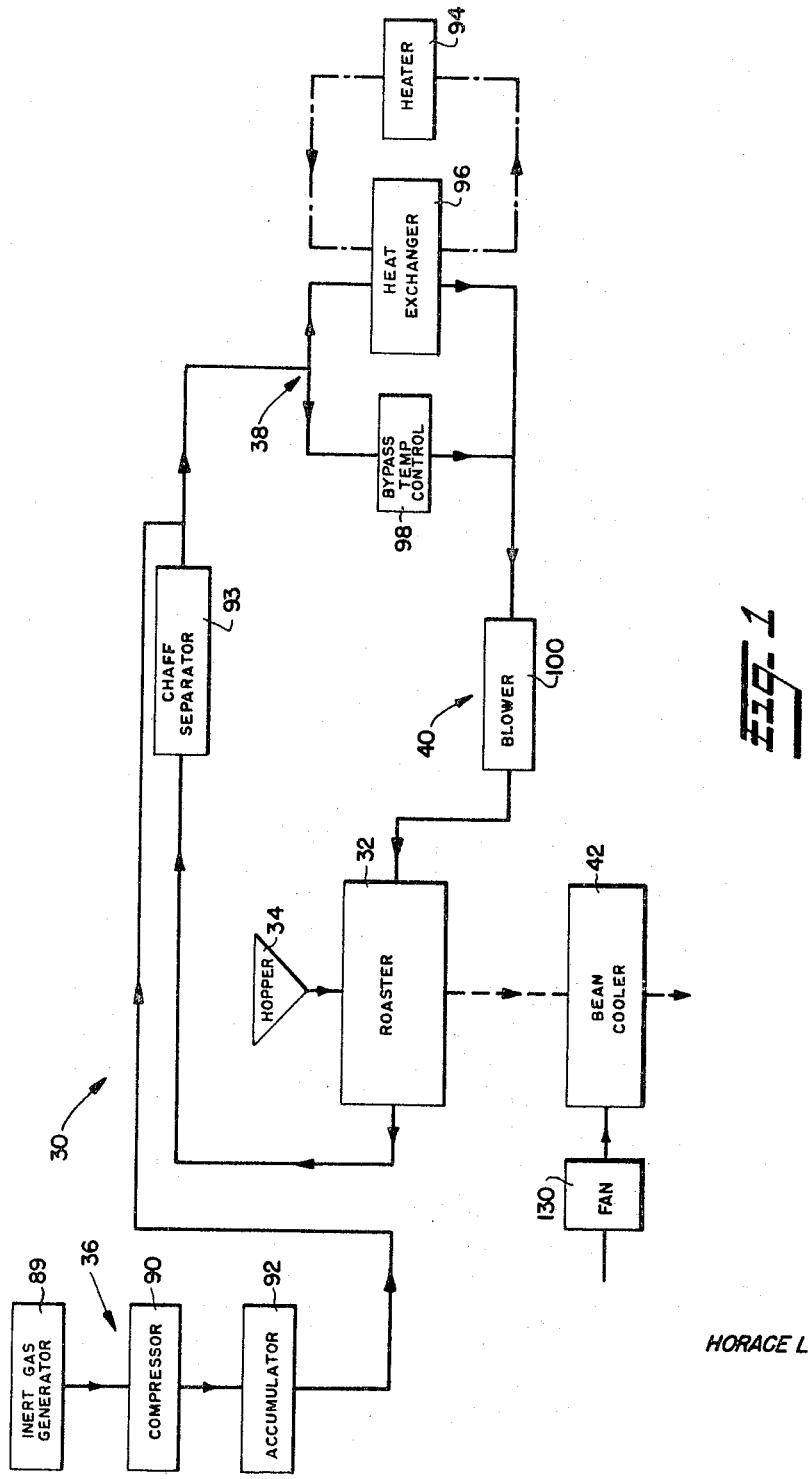

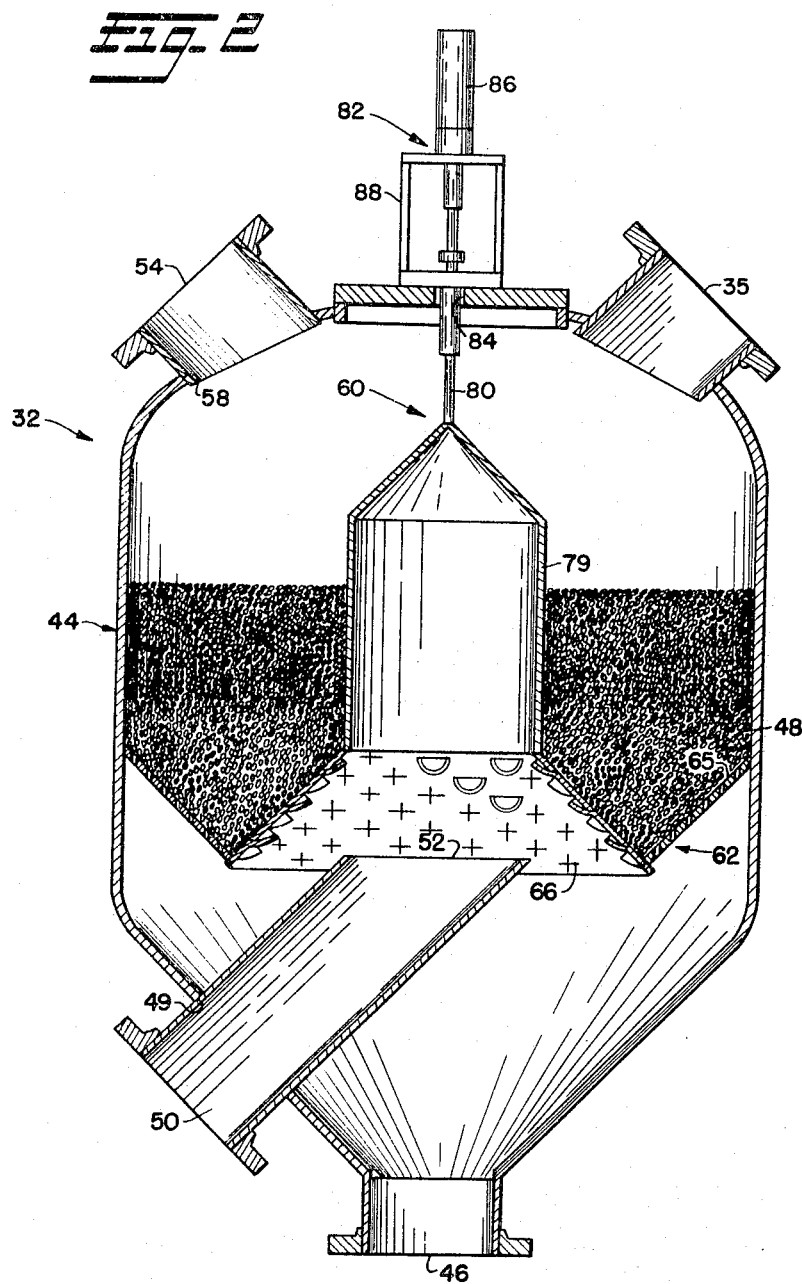

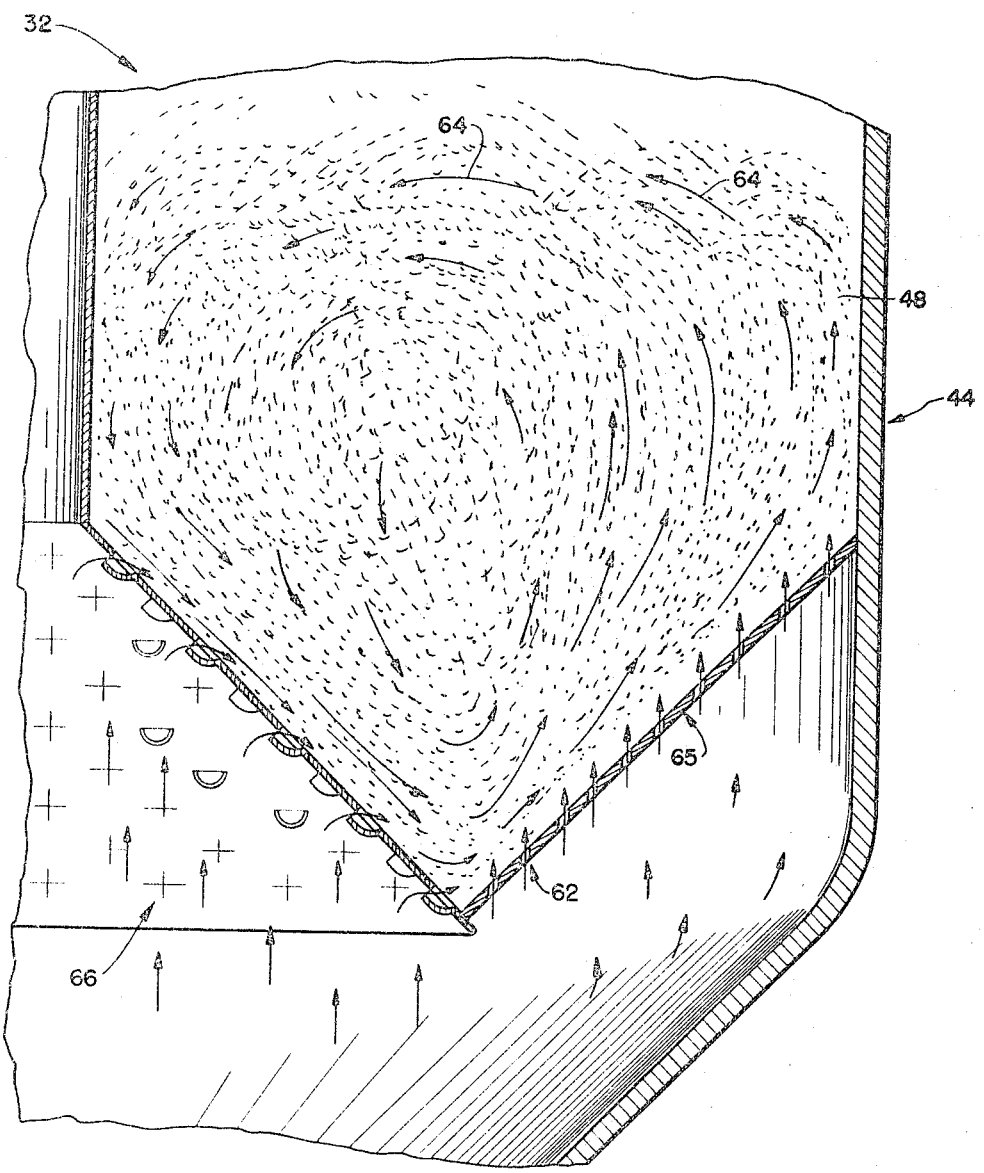

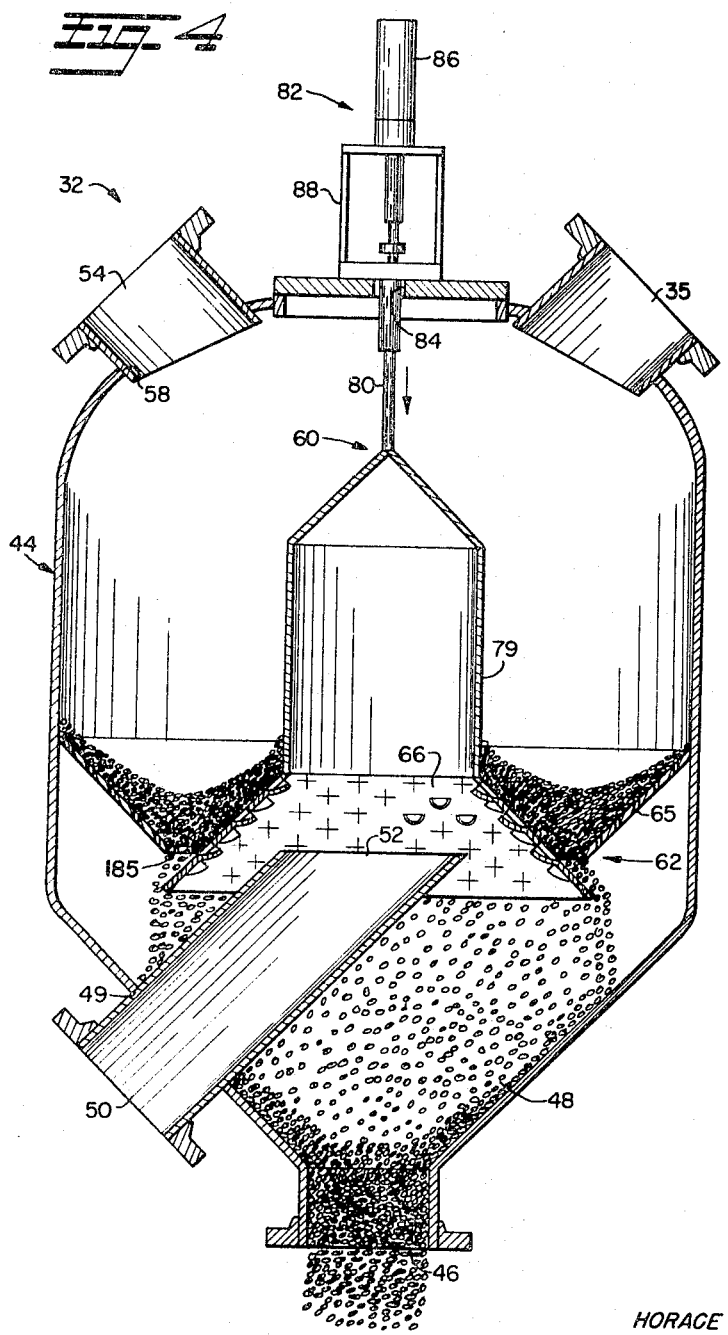

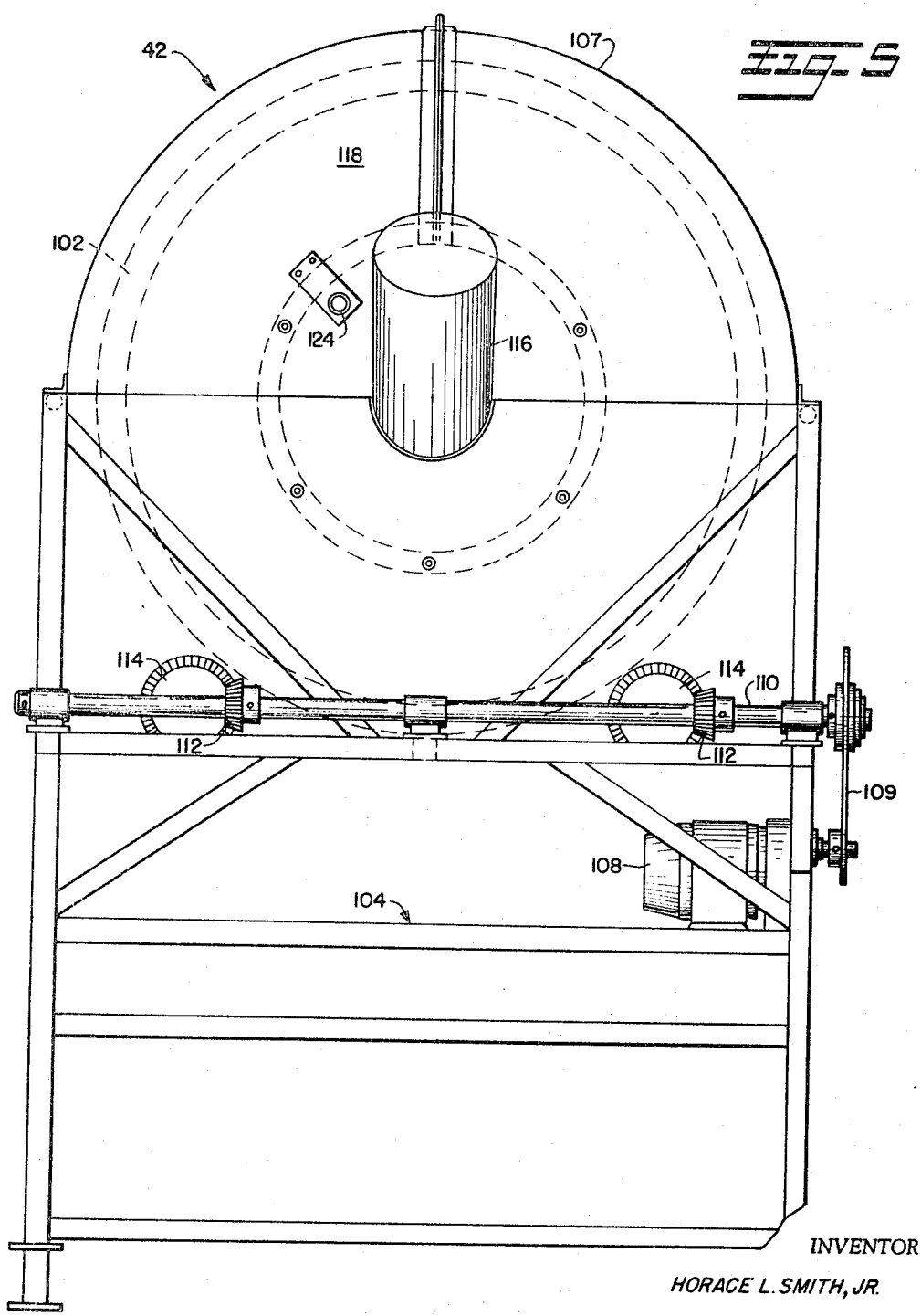

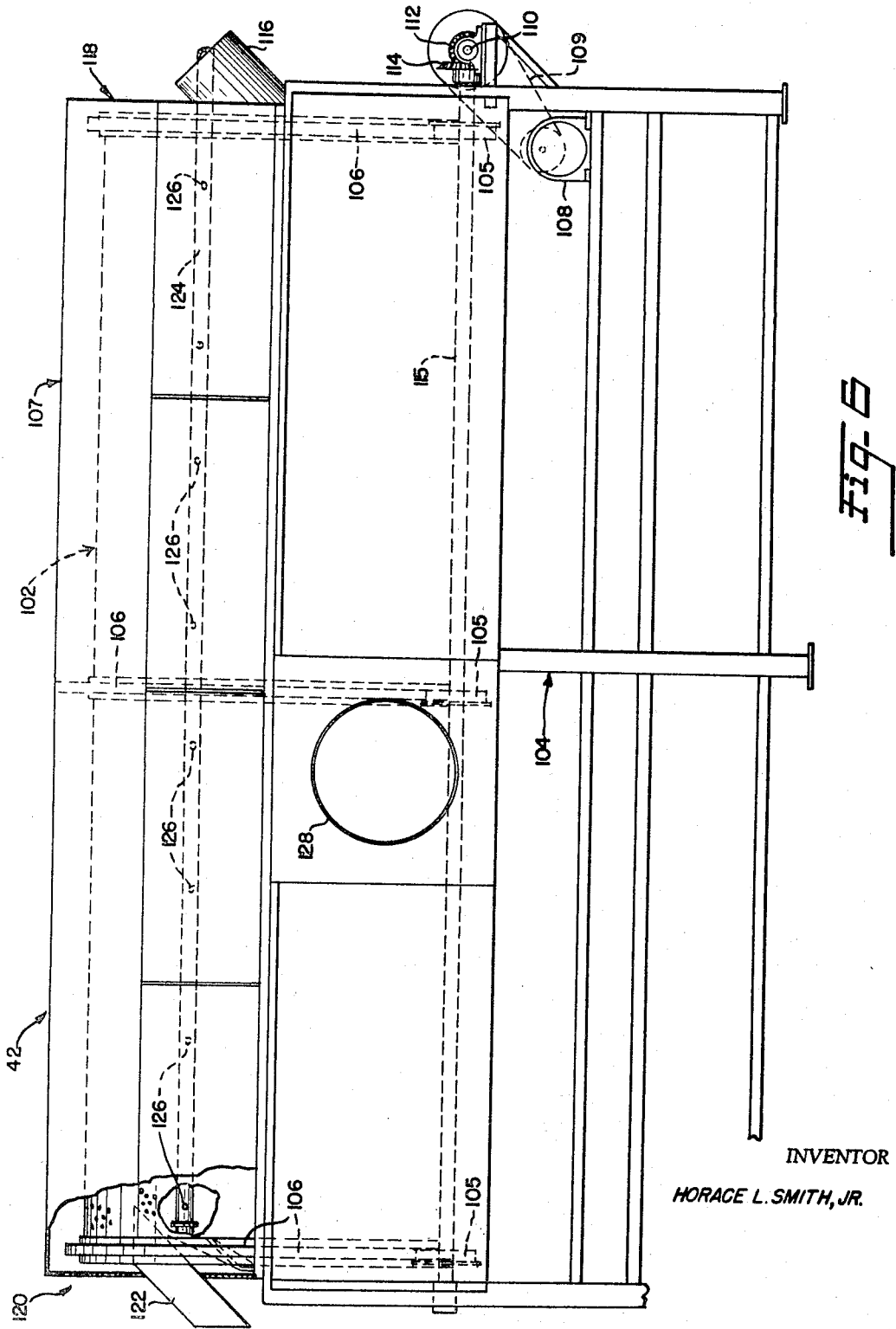

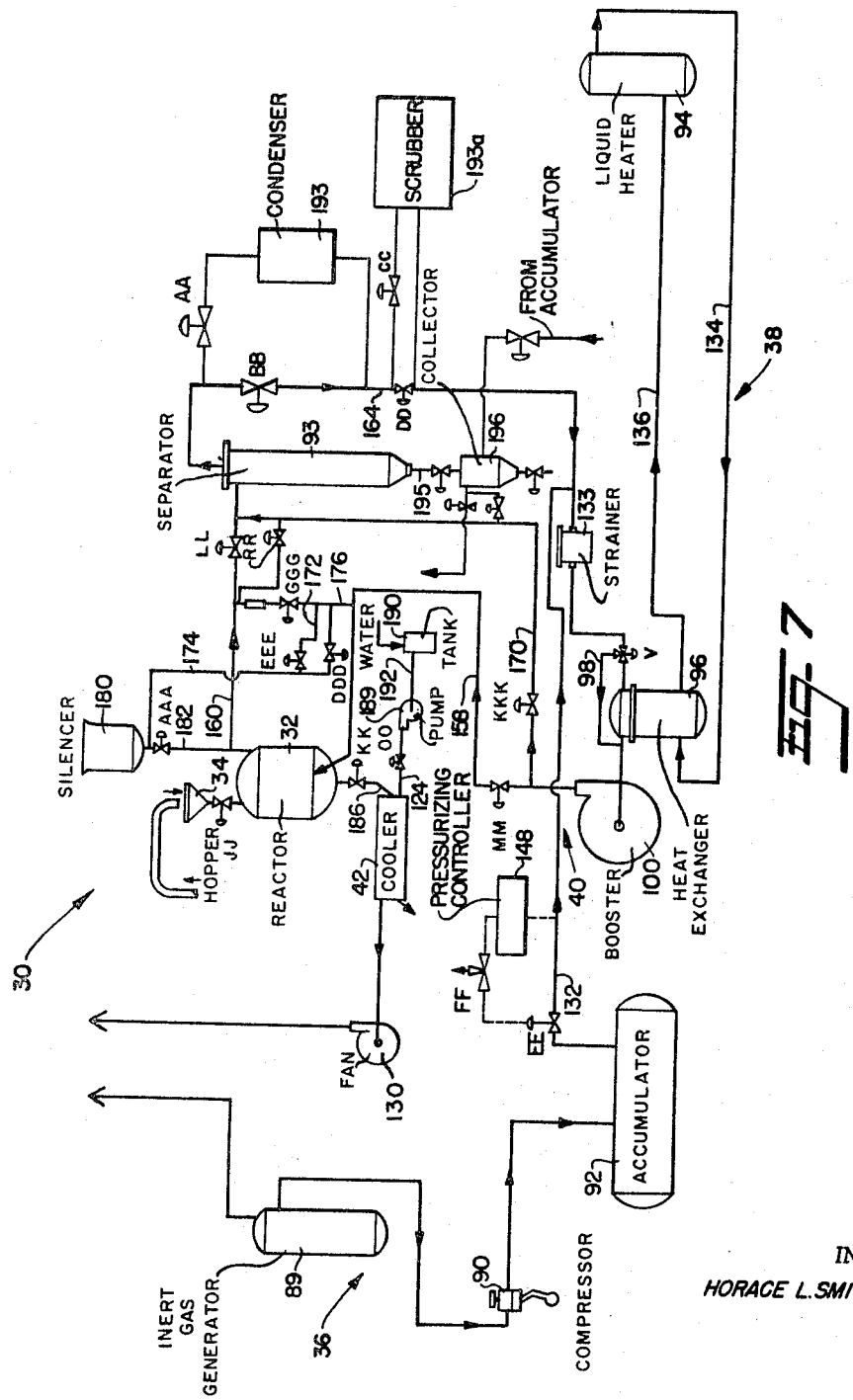

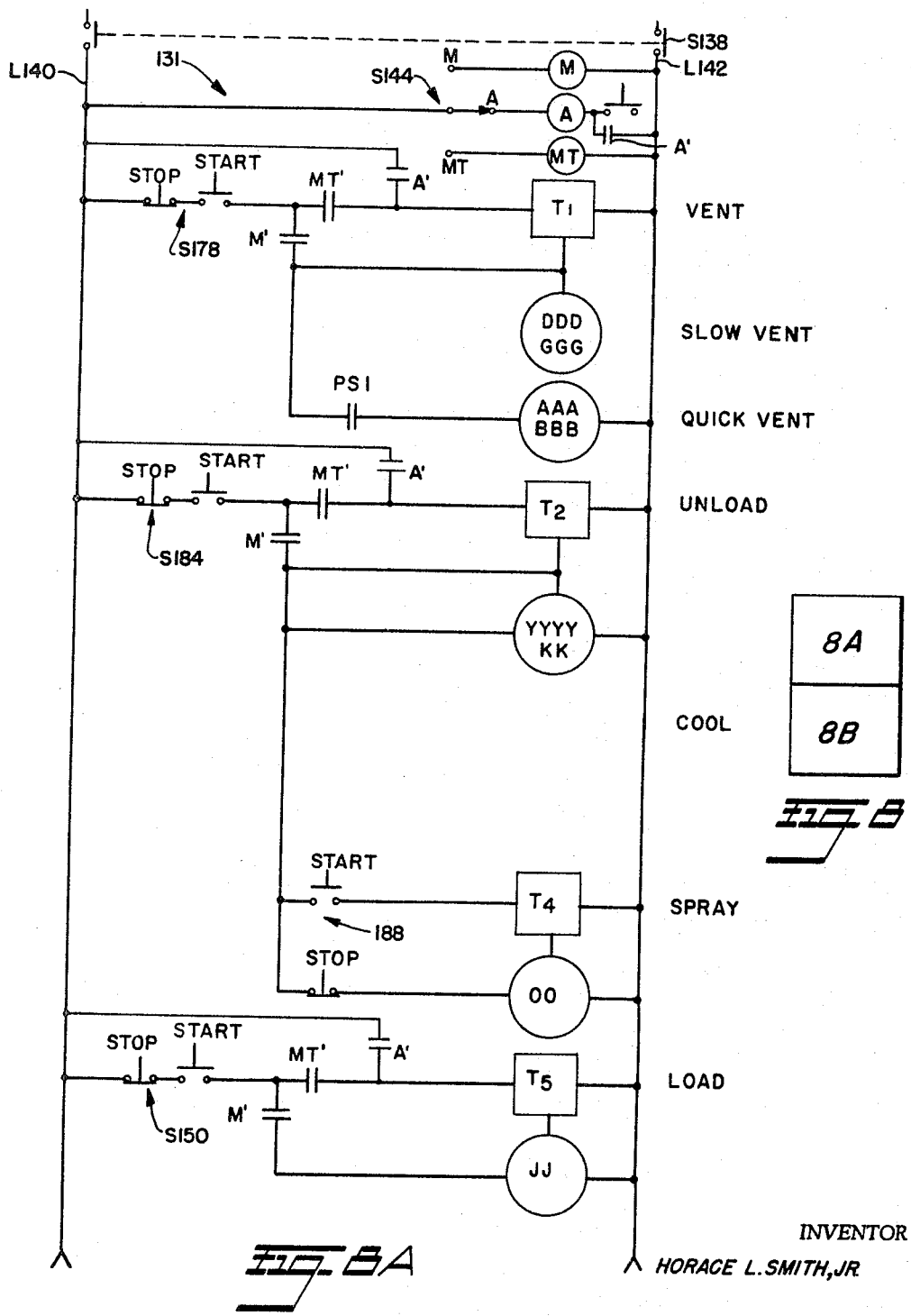

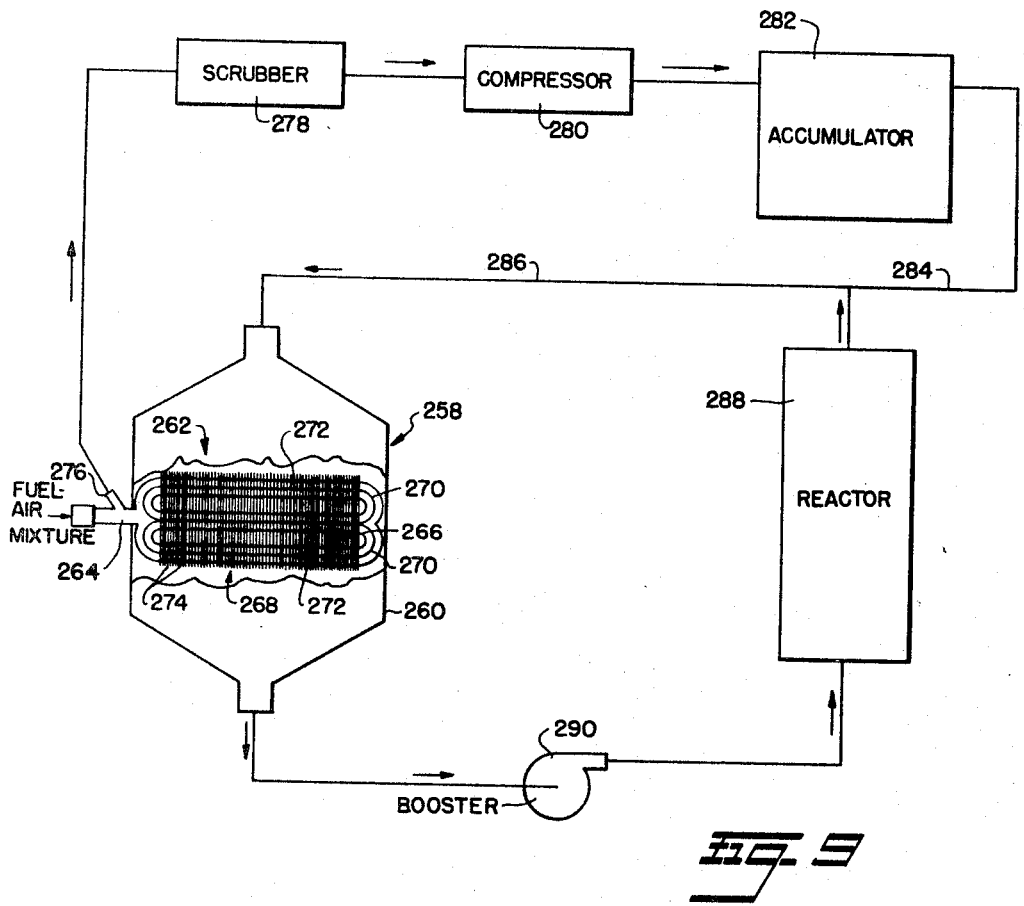

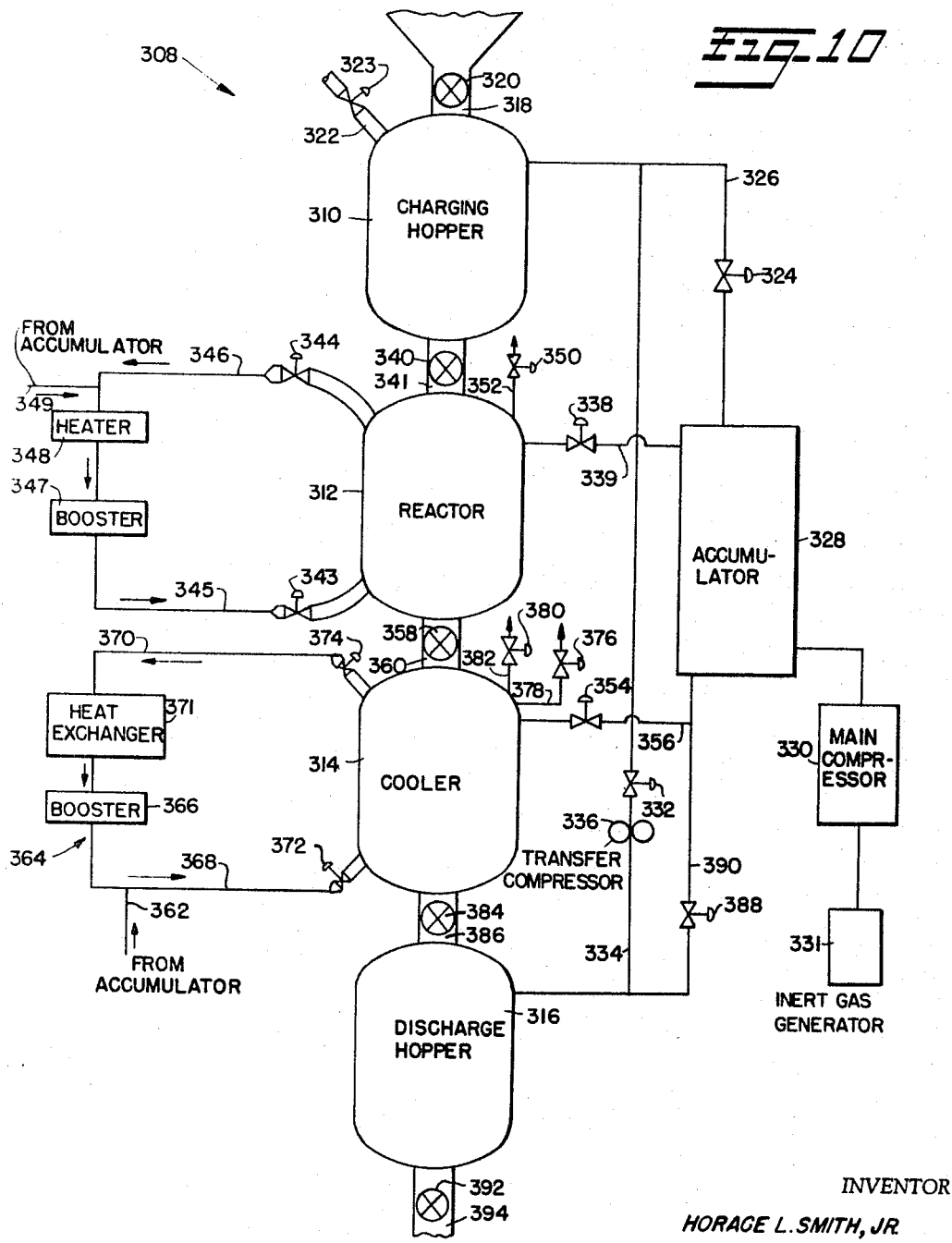

United States Patent Office 3,328,172
Patented June 27, 1967

3,328,172
METHODS OF ROASTING COFFEE AND SIMILAR PARTICULATE SOLIDS
Horace L. Smith, Jr., Richmond, Va., assignor to Hupp Corporation, Cleveland, Ohio, a corporation of Virginia
Original application Jan. 15, 1965, Ser. No. 425,702. Divided and this application Sept. 7, 1966, Ser. No. 577,754
19 Claims. (Cl. 99—68)

This application is a division of copending application No. 425,702 filed Jan. 15, 1965.

The present invention relates to novel improved methods of contacting fluids [1] and solids and to improvements in processes in which fluid-solids contact is employed.

For the most part, the principles of the present invention will be developed by relating them to the roasting of coffee and the like [2] as this specific application is the most important commercially at the present time and as, in another specific aspect, this invention relates to novel improved methods of roasting coffee and other similar products.

One of the primary objects of the present invention is to provide novel improved methods of contacting fluids and particulate solids.

The foregoing and other important objects of this invention are accomplished in part by utilizing a novel reaction vessel which can be pressurized and in which a bed of the solids to be treated is fluidized and continuously rotated [3] during the fluid treatment cycle. A number of advantages result from fluidizing and continuously circulating the solids while they are being contacted with the treating fluid as discussed in parent application No. 425,702.

Another important feature of the present invention, particularly in coffee roasting and similar applications, is the provision of a cooler including a novel timed spray for adding a predetermined amount of water to the roasted product in the form of a fine mist to quench the roast and control the moisture content of the roasted product. This provides important advantages over prior art roasting processes in which, as pointed out in U.S. Patent No. 2,278,473 issued to A. Musher, Apr. 7, 1942 for Coffee, the water is "thrown" on the roasted beans while they are still in the roaster. Among the more important of these are increased yields, a more uniform product, and longer shelf life. Among the other novel features of the present invention are a novel method of circulating the treating fluid which permits the reaction vessel to be depressurized for loading and unloading and other purposes without reducing the pressure in the remainder of the fluid circulation system. The advantages of this feature are manifest.

A further important feature is a novel method of accurately controlling the temperature of a heated fluid and the flow of the fluid through the roasting vessel. This is of material importance in that it provides precise control of the roasting or other heating process and, therefore, the final product.

The present invention preferably employs a closed roasting fluid circulation system, which permits the roasting fluid to be continuously recirculated through a suitable heating unit and the reaction vessel. This minimizes heat losses and, if an inert gas is employed, the amount of inert gas which it is necessary to generate.

Another important feature of this invention is the incorporation in the circulating system of a condenser or scrubber for removing from the fluid exiting from the reaction vessel at least a portion of the volatiles evolved from the product being roasted and carried from the vessel by the roasting fluid. Provision of the foregoing components makes it possible to closely control the composition of the roasting fluid. For example, this arrangement may be employed to remove from the roasting fluid undesirable evolved volatiles which would otherwise be recirculated to the reaction vessel and condense on the product being roasted or cause undesirable chemical reactions in the product. The arrangement just described, therefore, increases the versatility of the present invention and makes it capable of producing products of higher quality by affording control over the composition of the roasting fluid.

Further control over the treated product and additional versatility are provided by a novel method of pressurizing and venting the reaction vessel during and after the treatment cycle. This novel arrangement is particularly important in coffee roasting and similar applications as it provides precise control over such quality affecting factors as development (i.e., increase in size and reduction in bulk density) of the product being roasted and the nature of the volatiles in the roasted product and makes the plant adaptable to the processing of a wide variety of products.

From the foregoing it will be apparent that other important objects of the present invention reside in the provision of novel methods of contacting liquids and particulate solids which have the features discussed in the preceding paragraphs, singly and in various combinations.

Additional objects, other advantages, and further novel features of the present invention will become apparent from the appended claims and as the ensuing detailed discussion and description of preferred embodiments of the present invention proceeds in conjunction with the accompanying drawing, in which:

FIGURE 1 is a flow diagram of a plant for roasting coffee and the like constructed in accord with the principles of the present invention;

FIGURE 2 is a section through a roasting or reaction vessel employed in the plant of FIGURE 1 and for other processes involving fluid-solids contact;

FIGURE 3 is a fragment of a section through the reaction vessel of FIGURE 2 to an enlarged scale, showing the circulation pattern of the solids being treated;

---

Figure 8B:
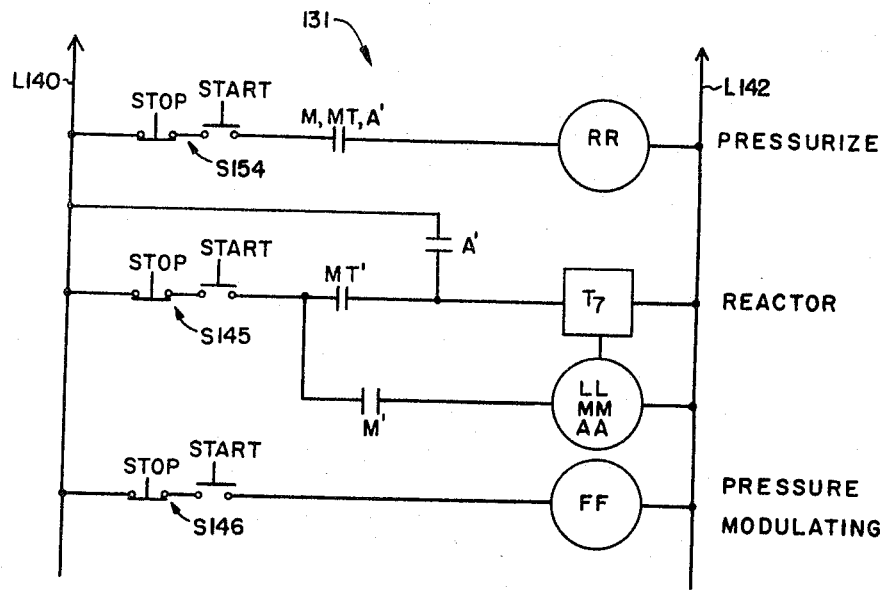

[1] The term "fluid" is used generically herein to encompass gases, mixtures of gases, and other materials with similar flow properties.

[2] Other typical applications of the present invention include the roasting of other food products such as cocoa beans and nuts and the manufacture of expanded food products such as puffed cereals and popcorn. The present invention may also be used for drying cereal grains or other particulate solids and for effecting a wide variety of chemical reactions commonly carried out in fluidized beds. In short, the present invention is applicable to virtually all processes involving the contact of fluids with particulate solids.

[3] The term "fluidized rotating bed" will be employed to describe a bed of solids which is fluidized and in which the solids continuously circulate in paths (shown in FIGURE 3) in which the solids move upwardly in the peripheral regions of the reaction vessel, inwardly in the upper part of the bed, downwardly in the inner region of the reaction vessel, and outwardly in the lower part of the bed.

FIGURE 4 is a view similar to FIGURE 2, but with the reaction vessel's dump mechanism operated to discharge the treated product from the reaction vessel;

FIGURE 5 is an end view of a cooler employed in the plant of FIGURE 1;

FIGURE 6 is a side view of the cooler of FIGURE 5;

FIGURE 7 is a simplified mechanical schematic of the installation of FIGURE 1;

FIGURE 8 is a diagram illustrating the relationship of FIGURES 8A and 8B which, together, constitute a simplified electrical schematic of the control system employed in the installation of FIGURE 1;

FIGURE 9 is a diagrammatic illustration of a second form of installation constructed in accord with the principles of the present invention; and FIGURE 10 is a generally diagrammatic illustration of a third form of coffee roasting installation constructed in accord with the principles of the present invention.

Referring now to the drawing, FIGURE 1 depicts diagrammatically a coffee roasting plant 30 constructed in accord with the principles of the present invention.[4] System 30 includes, generally, a roasting or reaction vessel 32 into which unroasted beans are loaded from a hopper 34 through an inlet 35, a system 36 for generating an inert roasting gas, a system 38 for heating the roasting gas, a system 40 for circulating the gas through the reaction vessel, and a cooler 42 for quenching the roast and cooling the roasted beans.

The most important component of roasting system 30 and one of the most important features of the present invention is reaction vessel 32, which is illustrated in more detail in FIGURE 2. Referring now to the latter figure, reaction vessel 32 has a vertically elongated cylindrical shell 44 which, in one actual embodiment of the present invention, has a diameter of approximately six feet. Inasmuch as, in many applications of the present invention, the fluid-solids treatment can advantageously be carried out under pressure, reaction vessel 32 is preferably constructed to withstand pressures of several hundred p.s.i. In the lower end of reaction vessel shell 44 is a centrally located aperture or dump opening 46 through which the coffee beans or otherwise treated (identified by reference character 48 in FIGURE 2) is discharged.

A second aperture 49, also formed in the lower portion of the reactor shell, accommodates an inlet conduit 50 for a heated roasting (or other) fluid. The fluid flows from conduit 50 into the reaction vessel through an outlet 52 in the lower central portion of the vessel.

The fluid thus supplied to the reaction vessel passes upwardly through the bed 48 of product being roasted or otherwise treated and is exhausted from the reaction vessel through an outlet conduit 54 extending through an aperture 58 in the upper part of shell 44.

In addition to the components just described, reaction vessel 32 also has a dump mechanism 60 for discharging the treated product through the dump opening 46 and a fluid distributing and directing or flow control assembly 62.

It is the function of flow control assembly 62 to direct the treating fluid entering the reaction vessel through inlet conduit 50 into the bed of solids 48 in such a manner as to fluidize the bed of solids and to effect a rotation of the bed by circulating the solids in paths in which they are moved upwardly in the peripheral regions of the reaction vessel, inwardly toward the center of the reaction vessel in the upper part of bed 48, downwardly in the central regions of the reaction vessel, and outwardly in the lower part of bed 48, as shown by arrows 64 in FIGURE 3. The circulation of the coffee beans or other particulate solids being treated through a path of the type just described is of extreme importance inasmuch as this pattern of circulation provides intimate, uniform contact between the particles in bed 48 and the heated gas or other treating fluid flowing through the bed of solids with the resulting advantages described previously.

As shown in FIGURES 2 and 3, flow control assembly 62 includes an outer frustoconical flow plate 65 bolted or otherwise fixed to the interior of reaction vessel shell 44 and an inner frustoconical flow plate 66 adapted to be moved upwardly against and engage the lower edge of flow plate 65 to support the bed of solids 48. Outer conical flow plate 65 is constructed to direct 60-70% of the fluid entering the reaction vessel through inlet conduit 50 in a generally vertical direction upwardly through the bed of solids 48. In the range of approximately 30-40% of the treating fluid is discharged into the bed of solids being treated through inner flow plate 66.

Flow plates 65 and 66 are described in detail in parent application No. 425,702, to which reference may be had, if desired.

Outer flow plate 65 and inner flow plate 66 are oriented with their upper surfaces at an angle of approximately 45° to the horizontal when installed in reaction vessel 32. The angle the nozzle plates make with the horizontal may be increased but should not be decreased substantially below 30° to insure that the angle their upper surfaces make to the horizontal exceeds the angle of repose of the beans or other product being treated. If it does not, the product will not slide off the nozzle plates when dump mechanism 60 is operated to discharge the treated product from the reaction vessel.

From the foregoing it will be apparent that both the flow through outer flow plate 65 and the flow through inner flow plate 66 have large velocity components tangential to the fluidized rotating bed. This provides rapid and complete circulation of the solids in the rotating bed through paths of the configuration described above.

Referring now to FIGURE 2, inner nozzle plate 66 is fixed, as by welding, to a vertically extending sleeve 79 of dump mechanism 60. The upper end of sleeve 79 is fixed, as by welding, to the lower end of the piston rod 80 of a hydraulic motor 82 with the piston extending through a sealed aperture 84 in the top of reaction vessel shell 44 to the exterior of the reaction vessel. At its upper end piston rod 80 is fixed to a piston (not shown) in the hydraulic motor's cylinder 86, which is supported from the top of reaction vessel shell 44 in a framework identified by reference character 88.

The function and operation of the novel reaction vessel 32 just described will become clear shortly from a description of the operation of a typical application of the reaction vessel; viz., the plant 30 of FIGURE 1.

Referring again to FIGURE 1, the system 36 included in coffee roasting installation 30 for providing the inert roasting gas for reaction vessel 32 includes an inert gas generator 89 for generating the inert gas, a compressor 90 for raising the pressure of the inert gas to a pressure at least equal to that which it is desired to maintain in reaction vessel 32, and an accumulator 92. The latter component is employed to insure that the supply of inert gas is adequate to rapidly pressurize gas circulation system 40 when plant 30 is started up and to rapidly replace gas vented from the reaction vessel during the roasting cycle. All of the foregoing components of the roasting gas generating system are conventional, commercially available items; and any type of equipment desired may be employed.

As shown in FIGURE 1, the roasting gas flows from the gas generating and accumulating system 36 into the heating system 38 provided for the roasting gas. The gas heating system is preferably of the closed, circulating liquid type and includes a chaff separator 93, a heater 94 for the circulating liquid heat exchange medium, a heat exchanger 96, in which the circulating medium gives up its heat to the roasting gas, and a bypass 98 for diverting the roasting gas around heat exchanger 96

---
[4] Coffee roasting plant 30 may equally well be employed to roast other products including those mentioned above and many others which will readily occur to those skilled in the arts to which the present invention pertains.

to maintain its temperature constant. A suitable heating system of this type is disclosed in my Patent No. 3,236,292 issued Feb. 22, 1966, for High Temperature Heating Apparatus.

The heated roasting gas is delivered from heat exchanger 96 to roasting or reaction vessel 32 by the fluid circulating system 40, the major component of which is a booster or blower 100. Like the components of installation 30 described previously, blower 100 may be of any desired, commercially available construction.

As shown in FIGURE 1, reaction vessel 32 is also connected to chaff separator 93 in the roasting gas circulation system 40; and the gas outlet of chaff separator 93 is in turn connected to heat exchanger 96. Thus, circulation system 40 is a closed loop for the roasting gas, permitting the gas exhausted from roasting vessel 32 to be recirculated through the chaff separator and heat exchanger and blower 100. This minimizes the amount of roasting gas which must be supplied from the inert gas generator during the roasting cycle, thereby minimizing the expense of operating the roasting installation.

Significant parameters relating to reactor geometry, gas flow, and bean charge in the roasting portion of coffee roasting plant 30 just described will vary from installation to installation. Values for a typical installation are set forth in parent application No. 425,702.

The remaining major component of coffee roasting installation 30 is the cooler 42 mentioned above and shown in FIGURES 5 and 6. This apparatus includes an elongated, cylindrical, cooling vessel or reel 102 rotatably supported from a frame 104 by car wheels or rollers 105 at the ends and the center of the cooler. The illustrated cooler 42 has a reel formed of 11 gauge, perforated, galvanized iron and is 16 feet long with an internal diameter of 60 inches. Cast iron rings 106, assembled on reel 102, engage car wheels 105 and prevent reel 102 from moving longitudinally relative to cooler frame 104. Reel 102 is surrounded by a housing of sheet metal construction identified generally by reference character 107. The details of housing 107 are not critical in the practice of the present invention and may be varied as desired.

Reel 102 is rotated at a speed of approximately 17 revolutions per minute by an electric motor 108 mounted on frame 104 and connected through a belt drive 109 to a shaft 110 rotatably supported from the framework 104 of the cooler. Bevel pinions 112, fixed to shaft 110, mesh with and rotate bevel gears 114 which, as shown in FIGURE 6, drive the shaft 115 on which car wheels 105 are mounted. The car wheels engage the cast iron rings 106 at the ends and center of the reel and rotate it by friction.

As shown in FIGURES 5 and 6, the beans to be cooled are dumped into reel 102 through a galvanized inlet chute 116. A helical guide (not shown), extending from one end of the reel to the other and fastened to the inside of the reel, distributes the beans from the inlet end 118 of cooler 42 to discharge end 120 as reel 102 rotates. At the discharge end of the cooler, the beans are discharged from reel 102 through a discharge chute 122 by a bucket type unloader (not shown).

As discussed above, after the roasted beans are dumped into cooler 42, they are sprayed with a fine mist of water[5] to quench the roast and to control the moisture content of the beans. For this purpose, cooler 42 is provided with a spray system including an elongated pipe or header 124 extending longitudinally through reel 102. Located at intervals of typically 21½ inches along header 124 are spray nozzles 126. Header 124 may be connected to any convenient source of water, the water flowing through header 124 and out nozzles 126 onto the beans in the form of a fine mist. As the bed of beans in reel 102 is continuously agitated as it is being sprayed, the foregoing system provides a uniform application of water to the beans.

The beans in reel 102 are also cooled by blowing air through the perforated reel for approximately 3–5 minutes. For this purpose, cooler housing 107 is provided with an air inlet 128 and a similar air outlet (not shown) on the opposite side of the housing, cooling air flowing in inlet 128, through reel 102 and the charge of beans therein, and out the exhaust opening.

A fan 130 (see FIGURE 1) is provided to effect the flow of cooling air through the cooler. Fan 130 may be of any desired construction.

The operation of the coffee roasting plant 30 just described is best understood by reference to FIGURES 7 and 8 which are, respectively, simplified schematics of plant 30 and of its control system 131 (see FIGURES 8A and 8B). Turning first to FIGURE 7, the plant is started up by putting the roasting gas generating and heating systems 36 and 38 into operation. As explained previously, the generator 89 produces inert gas (typically having a composition of approximately 88.5% nitrogen, 11% carbon dioxide, and 0.5% oxygen) which is compressed by compressor 90 and delivers to accumulator 92. From accumulator 92, the inert gas flows through conduit 132 into the gas circulating system 40 ahead of strainer 133 and then through the strainer. Strainer 133 prevents fine particles which remain in the recirculated roasting gas after it passes through chaff separator 93 from being recirculated to reaction vessel 32 and plugging the flow apertures in nozzle plates 65 and 66. From strainer 133, the inert gas flows into the heat exchanger 96 of gas heating system 38. Here, the inert gas is heated to a temperature typically on the order of 400–445° F. by a liquid heat transfer medium (such as Therminol FR–2) circulating through a closed path including heater 94, supply conduit 134, heat exchanger 96, and return conduit 136.

The roasting gas side of heat exchanger 96 is incorporated with reactor 32 in the closed gas circulating system 40. The heated inert gas is circulated through this system to purge it, stabilize its components at the temperature of the inert gas, and to increase the pressure in the system to the roasting pressure. The plant is then ready to process the first batch of beans.

Plant 30 is constructed so that the various steps in the process cycle may be controlled manually or automatically or by manual timed programming in which each step of the cycle is initiated manually but is thereafter automatically controlled. In the ensuing description of a coffee bean roasting cycle manual operation of the plant will be assumed for the sake of convenience.

Manual control is provided by closing a master switch S138 to complete the continuity in control circuit main leads L140 and L142 and moving a selector switch S144 (FIGURE 8B) to its "M" contact, thereby energizing a relay M having normally open contacts M', all of which are closed by energization of the relay. Switch S145 (FIGURE 8B) is then moved to the "Start" position, completing a circuit between control circuit main leads L140 and L142 through the solenoids of normally open valves LL and MM. Energization of the foregoing solenoids closes valves LL and MM, isolating reactor 32 from the rest of the closed gas circulating system 40. This is an important feature of the present invention as it permits reactor 32 to be depressurized when it is loaded and unloaded without loss of pressure in the remainder of gas circulating system 40. Consequently, the vessel can be repressurized in minimum time and with a minimal power input after it is loaded; and, moreover, equilibrium conditions are maintained in the remainder of the circulation system.

At the same time or before switch S145 is closed to isolate the reactor vessel, a second switch S146 (see FIG-

---

[5] Sodium bicarbonate or other alkaline materials may be added to the water, if desired, to reduce the acidity of the roasted product although such treatment may normally not be required in roasting coffee in accord with the principles of the present invention.

URE 8B) is moved to "Start," completing a circuit between leads L140 and L142 through the solenoid of a normally closed valve FF. This opens valve FF and provides communication between a pressure modulating valve EE in the roasting gas conduit 132 between accumulator 92 and heat exchanger 96 and a pressurizing controller 148 arranged to sense the pressure in conduit 132. Controller 148 and valve EE regulate the flow of inert gas from accumulator 92 into conduit 132 while reactor 32 is isolated from the rest of the gas loop 40 to maintain the pressure on the booster side of the loop at a pressure preferably slightly above the selected roasting pressure.

After isolating valves LL and MM are closed, switch S150 is moved to the "Start" position, completing a circuit through the solenoid of a normally closed valve JJ between hopper 34 and reactor 32, opening valve JJ. This permits a charge of unroasted beans (850 pounds in the embodiment of the invention mentioned above) to flow from hopper 34 into reactor 32.

After reactor 32 is loaded, switch S150 is moved to the "Stop" position, deenergizing the solenoid of and closing valve JJ and thereby isolating reactor 32 from the surrounding atmosphere. Reactor 32 is then pressurized by closing switch S154 (see FIGURE 8B), which completes a circuit between leads L140 and L142 through the solenoid of normally closed pressurizing valve RR, opening the valve. This establishes communication between the booster and reactor vessel sides of isolating valves LL and MM, providing equalization of the pressure on the reactor and booster sides of the isolating valves in minimum time.

When the pressure in reactor 32 reaches on the order of 110 p.s.i.g., switch S145 is moved from the "Start" to the "Stop" position, deenergizing the solenoids of isolating valves LL and MM, thereby opening the valves and establishing communication between reactor 32 and the remainder of the gas circulating loop 40. This starts circulation of the roasting gas through reactor 32.

In a typical coffee roasting application of the present invention, the roasting of low grade, inexpensive African beans, the roasting pressure employed is preferably in the range of 130–150 p.s.i.g. and may advantageously be on the order of 140 p.s.i.g.[6] The reason for employing a pressure in this particular range is that, in roasting low grade African beans, which is the application for which pressures in the foregoing range are employed, if roasting pressures above 150 p.s.i.g. are employed, undesirable volatile constituents will be retained in the roasted beans; and coffee brewed from them will have a harsh metallic taste. On the other hand, if roasting pressures substantially below 130 p.s.i.g. are employed, losses in the roasting process will be unacceptably high.

For a roasting pressure of 140 p.s.i.g., reactor 32 is only pressurized to 125 p.s.i.g. at the beginning of the roast. This is because, as the heated roasting gas is initially circulated through the beans and their temperature increases, copious quantities of water vapor and other volatiles are given off by the beans. This rapidly raises the pressure in reactor 32 to the desired 140 p.s.i.g. roasting pressure. Consequently, by taking advantage of the presence of volatiles in the coffee beans, the amount of roasting gas required to pressurize reactor 32 can be substantially reduced.

The roasting gas is circulated from heat exchanger 96 by booster blower 100 through supply conduit 158 into reactor 32 through the inlet 50 in its lower end. As described previously, the heated roasting gas is directed into the bed of beans in the reactor by flow plates 65 and 66 in a manner which effects the novel circulation of the beans described previously and shown by arrows 64 in FIGURE 3. This provides a rapid turnover of the beans being roasted (the bed makes a complete revolution in about 1–2 seconds), providing a uniform and extremely rapid transfer of heat from the roasting gas to the beans.

From reactor 32, the roasting gas flows through return conduit 160 into chaff separator 93, which may be of the conventional centrifugal type, where the chaff picked up in reactor 32 is separated from the roasting gas. From the chaff separator, the cleaned roasting gas may flow through a further return conduit 164 and strainer 133 back into heat exchanger 96 or through bypass conduit 98 directly back into booster 100. Flow through bypass conduit 98 is controlled by a temperature responsive modulating valve V, which is regulated by a controller (not shown) responsive to the temperature of the roasting gas entering booster 100.

Since the liquid heat transfer medium circulating through heat exchanger 96 is maintained at a constant temperature, the heat exchanger cannot accommodate variations in the temperature and heat capacity of the roasting gas in return conduit 164. The bypass arrangement just described, however, varies the proportions of the roasting gas flowing through and around the heat exchanger to accommodate such variations and maintain the temperature of the roasting gas delivered to reaction vessel 32 by booster blower 100 constant.

To regulate the rate of flow of roasting gas through the reactor vessel, a bypass conduit 170 with a valve KKK is connected between the roasting gas supply and return conduits 158 and 160. By closing valves LL and MM and moving valve KKK between its closed and fully open positions, the flow of roasting gas discharged from booster 100 may be proportioned between the reactor and bypass conduit. Conduit 170 and valve KKK are provided since different types of coffee beans are of different sizes and have different bulk densities and therefore require differing rates of flow of the roasting gas through reactor 32 to produce the novel pattern of circulation shown in FIGURE 3.

In addition to providing a uniform roasting gas temperature, plant 30 is capable of maintaining a constant pressure in reaction vessel 32. To accomplish this, a modulating relief valve EEE is incorporated in a gas conduit 172 connected between vent conduit 174 (which leads to atmosphere) and a branch conduit 176 connected to the main gas return conduit 160. Valve EEE responds to the pressure in conduit 172, which is the same as the pressure in reactor 32; and vents reactor 32 through conduits 160, 176, 172, and 174 if the pressure in the reactor vessel rises above the desired roasting pressure.

A typical duration of the roasting period, depending upon the type of beans being roasted, is 4 minutes and 40 seconds to 7 minutes and 42 seconds[7] (this contrasts sharply with the conventional coffee roasting processes heretofore employed in which the roasting gas is heated to temperatures in the range of 600–700° F. and the beans are roasted for a period of 15–20 minutes). At the end of the roasting period, switch S145 (FIGURE 8B) is again moved to the "Start" position to energize the solenoids of and close valves LL and MM and thereby isolate reactor 32 from the rest of gas circulation loop 40. Switch S178 (FIGURE 8A), is then moved to the "Start" position, energizing the solenoids of normally closed slow vent valve DDD and normally closed equalizing valve GGG.

Opening of slow vent valve DDD slowly vents reactor

---

[6] For milder coffees such as Guatemalan and Malacaton, best results qualitywise may be obtained at pressures on the order of 60–80 p.s.i.g. although the yield may be slightly lower. On the other hand, coffees have been successfully roasted at pressures as high as 300 p.s.i.g. by the techniques described herein. It will be apparent, therefore, that the processing pressure is not a fixed invariable parameter, but, for optimum results, must be altered for the particular product or type of product being treated and the nature of the treated product it is desired to obtain.

[7] Instead of roasting for a pre-established time, the roast may be continued until it reaches a predetermined temperature. Typically, this temperature may be on the order of 390–408° F. although it will depend upon the type of beans being roasted and the nature of the roast desired—e.g., the final bean temperature will be higher for a dark roast than a light roast. The roast may also be controlled by using a conventional color analyzer to stop the roast when the beans reach the desired color.

32 through conduits 160, 176, and 174 and silencer 180 to atmosphere. The slow vent is provided to facilitate a controlled expansion and consequent reduction in bulk density of the roasted beans. Specifically, slow venting is required to prevent the excessive development of beans which would result if reaction vessel 32 were rapidly vented from a roasting pressure of 130–150 p.s.i.g. for example, to atmospheric pressure. The excessive development would be accompanied by an increase in weight loss and consequent reduction in yield which would make the present process economically impractical. Typically reaction vessel 32 is vented from 130–150 p.s.i.g. to 25–50 p.s.i.g. in about 6 seconds in the slow vent; but the venting time and intermediate pressure may vary, depending upon the type of bean being roasted.

Movement of switch S178 to the "Start" position to open slow vent valve DDD also completes a circuit to the solenoid of a quick vent valve AAA as far as a pressure switch PS1, which is responsive to the pressure in main gas return conduit 160. When the pressure in conduit 160 and, therefore, in the reactor vessel drops to a pressure typically on the order of 50 p.s.i.g. (but which may be as low as 25 p.s.i.g.), pressure switch PS1 closes, completing the circuit to and energizing the solenoid of quick vent valve AAA. This permits a quick venting [normally less or slightly more than one second] of the reactor vessel from the pressure at which switch PS1 is set to atmospheric pressure through conduits 160 and 182 and silencer 180. The quick vent from an intermediate pressure to atmospheric pressure has been found to be essential to proper development of the beans and consequent attainment of the desired bulk density of the roasted product.

Referring now to FIGURE 7, the equalizing valve GGG opened at the same time as slow vent valve DDD by movement of switch S178 to the "Start" position, is located in the branch gas return conduit 176 connected between gas supply conduit 158 and main gas return conduit 160. Opening of valve GGG permits venting of reactor 32 through both the supply conduit 158 and the return conduit 160. Therefore, reactor 32 is vented from both above and below the flow control assembly 62 in the reactor vessel since supply conduit 158 is connected to inlet 50 below the flow control structure and return conduit 160 to outlet 54 above assembly 62. This is an important feature of the present invention as venting from both sides of the flow control assembly prevents the imposition of harmful stresses on it.

After reactor 32 is vented, switch S178 is moved to the "Stop" position, closing the slow and quick vent valves DDD and AAA and pressure equalizing valve GGG. Switch S184 is then moved to the "Start" position, completing a circuit between control system leads L140 and L142 (see FIGURE 8A) through the solenoid of normally closed dump valve KK and a solenoid YYYY which operates hydraulic motor 82. Upon energization of solenoid YYYY, hydraulic motor 82 moves dump sleeve 79 and the conical inner flow control plate 66 downwardly from the position shown in FIGURE 2 to the dump position shown in FIGURE 4. This allows the beans in reactor 32 to flow through the annular gap 185 between inner and outer flow plates 66 and 65 into the lower portion of reactor 32 and out dump opening 46 in the bottom of the reactor.

From discharge outlet 46, the roasted beans flow through a discharge conduit 186, in which the now open valve KK is located, into cooler 42. As soon as the roasted beans are in cooler 42, switch S188 is closed, completing a circuit through the solenoid of and opening normally closed valve OO. With valve OO open, a pump 189 of any desired construction circulates water from a tank 190 or other source through a line 192 into spray header 124 (see FIGURES 5 and 6). This water is sprayed in the form of a fine mist from header 124 through spray nozzles 126 onto the beans as they are tumbled and agitated in rotating reel 102 as discussed previously.

The spray is preferably maintained for a period of 8–10 seconds and the flow through header 124 regulated so that at least 1.0 and preferably on the order of 1.1 gallons of water per 100 pounds of roasted beans or more is sprayed on them. The roasted beans are sprayed in the manner just described to quench the roast and stop it at a definite point and to control the moisture content of the roasted beans, as mentioned previously. Quenching of the roast is extremely important since it has been found that a variation of 5–10 seconds in a roast having a duration of over six minutes will affect the characteristics of the roasted beans to such an extent that the difference in flavor will be readily detectable to the average coffee drinker.

As discussed previously, in the conventional process water is dumped on the roasted beans as they lie in a quiescent mass in the bottom of the rotating vessel itself. A typical African bean roasted and quenched in this conventional manner has a yield loss of 15–16 percent. By roasting the same beans in the manner described above, but without a quenching spray, this loss is reduced to 11½–12 percent. By adding a spray of the type described above to add moisture to the roasted beans in a uniformly applied fine mist, the loss is further decreased to less than 10 percent, giving the process disclosed herein an important economic advantage over the conventional process.

There is another extremely important advantage to quenching the roasted coffee beans in the manner just described. In conventional processes, the shelf life of the roasted product is approximately inversely proportional to its moisture content. That is, as the moisture content is increased, the shelf life of the roasted product is correspondingly decreased. Unexpectedly, it has been found that coffees roasted in accord with the present invention, including the application of a spray in the manner just described, have a much longer shelf life than the same coffees roasted in the conventional manner, even though those roasted by the present process have a much higher moisture content.

As discussed above, one of the important features of the process disclosed herein is the step of slowly reducing the pressure on the beans at the end of the roasting cycle to provide an accurate controlled development of the beans. It has also unexpectedly been found that beneficial results can be provided by interrupting the roasting during the roasting cycle, similarly slowly reducing the pressure on the beans, and then repressurizing the reactor vessel and finishing the roast. Venting during the roast cycle is employed to reduce the pressure on undesirable volatiles and cause them to vaporize so that they can be vented from the reaction vessel. Consequently, venting during the roast may, particularly in the roasting of low grade coffees, be utilized to substantially upgrade the quality of the final product.

By controlling the temperature at which and the pressure to which the beans are vented in the interrupted roast, the nature of the roasted product produced from a given type of bean can be varied widely to suit the taste preferences of people in different areas and for other purposes. Particular bean temperatures and venting pressures vary widely depending upon the coffee being roasted and the nature of the roasted product desired. Generally speaking, however, lower grades will be vented less than more mild grades to retain desirable volatiles which are lost if the pressure on such beans is reduced too much. More mild coffees, on the other hand, are preferably vented to a greater extent because they will otherwise perhaps retain undesirable components which detract from their flavor and taste.

Typically, for low grade beans, reactor 32 may be vented from 140 p.s.i.g. to 100 p.s.i.g. for a period on the order of 6 seconds and then repressurized. However, as indicated above, depending upon the nature of the final product desired and the beans being roasted, both time and pressure parameters will vary widely. The following table shows how variations in these parameters affect the characteristics of the roasted product.

| Kind of Coffee | Venting Temp., °F.* | Vented to— p.s.i.g. | Remarks |
| --- | --- | --- | --- |
| Santos JAM-L11 | 300 | 60 | Good cup, best cup of 300° F. series. |
| Do | 300 | 80 | Slightly sharp. |
| Do | 300 | 100 | Good cup. |
| Do | 300 | 120 | Slightly sharp. |
| Do | 325 | 60 | Do. |
| Do | 325 | 80 | Very good cup. |
| Do | 325 | 100 | Slightly sharp. |
| Do | 325 | 120 | Do. |
| Do | 350 | 60 | Sharp. |
| Do | 350 | 80 | Good cup. |
| Do | 350 | 100 | Slightly sharp. |
| Do | 350 | 120 | Definitely sharp. |
| Do | 375 | 60 | Sharp. |
| Do | 375 | 80 | Slightly sharp. |
| Do | 375 | 120 | Good cup. |

Rerun of best samples from above gave following results

| | | | |
| --- | --- | --- | --- |
| Santos JAM-L11 | 300 | 60 | Very good cup. |
| Do | 325 | 80 | Do. |
| Do | 350 | 80 | Slight metallic or sharp flavor. |
| Do | 375 | 120 | Good cup. Not quite as high quality as the 300° F. and 325° F. samples. |

* Measured by a probe in the bed of beans 48.

Slow venting of reaction vessel 32 in the interrupted roast is accomplished in the same manner as described above in conjunction with the slow venting of reactor 32 at the end of the roast.

In addition to producing coffee to be ground for brewing, the process of the present invention is also peculiarly adaptable to the roasting of coffee for the extraction process employed in the production of instant coffee. In roasting coffee beans for the production of instant coffee, the coffee is preferably roasted under pressure (with or without venting during the roast to remove undesirable volatiles) and then cooled under pressure without venting. The roasted beans are therefore undeveloped and have a high bulk density. However, this is immaterial in the production of instant coffee. The important advantage of both roasting and cooling under pressure is that the yields are even higher than when the beans are roasted and cooled in the manner just described.

In conjunction with venting during a roast to remove undesirable volatiles and venting during the cooling portion of the cycle to control development of the beans, it is to be understood that the exemplary venting pressures discussed above are not critical but may vary widely depending upon the product being roasted and the roasting conditions.

For example, as described previously, coffees may be roasted in accord with the principles of the present invention at pressures at least up to 300 p.s.i.g. In fact, for certain applications of the present invention, pressures on this order are preferred because losses in yield can be reduced to on the order of 2–3%. When roasting at pressures on this order, venting pressures substantially higher than those discussed above may be employed to remove undesired volatiles from the beans. For example, in roasting certain coffees, the undesired volatiles can be removed by venting the reaction vessel to a pressure typically on the order of 250 p.s.i.g.

In other words, the venting pressure is not a fixed constant, but must be varied from application-to-application. The important factors in conjunction with venting during the roast are: (1) that the pressure be selected to volatilize the undesirable constituents which it is desired to remove from the beans without volatilizing those which it is desired to retain; and (2) that the pressure be sufficiently high that losses in yield resulting from venting will not be unacceptably large.

Another important feature of the process just discussed is that it is not necessary to employ an inert roasting gas although such a gas is preferable for many applications of the present invention because it minimizes fire hazards which would be existent if air were employed as the roasting gas and also because, if air is employed as the roasting medium, the outside of certain types of coffee beans may be oxidized to a black color which is less preferable than a rich deep brown color.

However, it has been found that, by properly controlling the roasting parameters, the fire hazard can be minimized and unacceptable darkening of the beans can be prevented, even though an oxygen-containing gas is employed. And, unexpectedly, it has been found that the presence of at least some oxygen in the roasting gas is beneficial because the oxygen promotes certain of the flavor producing roasting reactions. The specific composition of the roasting gas, therefore, may and generally will vary considerably depending upon the particular type of beans to be roasted and the desired nature of the end product.

The composition of the roasting gas may be further controlled by treating the recirculated roasted gas before it is reheated in heat exchanger 96 to remove undesirable volatiles evolved from the roasting coffee which might otherwise be recirculated to and deposited on the beans in reactor 32 or enter into unwanted chemical reactions with them, thereby adversely affecting the roasted product.

This may be accomplished by cooling the recirculated roasting gas to condense the undesirable volatiles and thereby facilitate their removal from the roasting fluid. For the most part, the undesired volatile constituents apparently have boiling points well above the boiling point of water. Therefore, in cooling the recirculated roasting gas in accord with the principles of the present invention, the gas is preferably not cooled to a temperature below the boiling point of water. This is because the recirculated roasting gas contains a substantial portion of water vapor; and, if the water vapor is condensed, a large amount of sensible heat is removed from the recirculated gas and must be replaced in heater exchanger 96. However, by maintaining the temperature to which the recirculated gas is cooled above the boiling point of water, the undesirable high boiling point constituents can be removed from the treating fluid with only a minimal diminution of the sensible heat in the recirculated roasting fluid.

Although the recirculated gas is preferably not cooled below the boiling point of water for the limits discussed above, it is to be understood that this limit is not critical in the practice of the present invention. For example, in roasting certain types of coffees or other products, it may be necessary to cool the recirculated gas below the boiling point of water to insure the condensation of all undesired volatiles in the recirculated gas. In other applications, cooling to the boiling point of water may be too low as this may condense volatiles which it is desired to recirculate to the reaction vessel to, for example, promote beneficial reactions in the product being roasted. Therefore, the specific temperature to which the recirculated gas is cooled will necessarily vary with the nature of the installation and the type of product being treated.

In addition, it may be neither desirable nor necessary to remove all of a particular constituent (or all of a number of constituents) from the recirculated gas. Consequently, the present invention contemplates removal of only a portion of the evolved volatiles present by removing such constituents from only a portion of the recirculated fluid.

Condensation of undesired constituents in the recirculated roasting fluid is readily and quickly accomplished by opening valve AA and closing valve BB (see FIGURE 7) to divert a part or all of the gas flowing through return conduit 164 through a condenser 193 connected in parallel with the return conduit. Valves AA and BB may be regulated manually or automatically; and their settings may be varied to alter the proportion of recirculated fluid flowing through the condenser. Consequently, by manipulating valves AA and BB, the composition of the roasting gas may be varied for a particular product or during the roast and compensations may be made for changes in the rate at which the undesirable volatiles are evolved during the roast.

In conjunction with the foregoing, it is not necessary that removal of volatile constituents from the recirculated roasting fluid be accomplished by the use of a condenser, as described above. For example, removal of volatile constituents may also be effected by passing the recirculated roasting fluid through a conventional scrubber such as shown at 193a in FIGURE 7. Referring now to the latter figure, valve CC may be partially or completely opened and valve DD closed to a corresponding extent to divert a part or all of the gas flowing through return conduit 164 through scrubber 193a. Valves CC and DD may be varied during the roast to alter the proportion of recirculated fluid flowing through the scrubber. Consequently, by manipulating valves CC and DD, the composition of the roasting gas may be varied for a particular product or during the roast to compensate for changes in the rate at which the volatiles to be removed are evolved during the roast.

It is not necessary that the roasting gas be maintained at a constant temperature throughout the roast. In fact, in order to develop desired characteristics in the roasted product, the roasting gas temperature may be varied during a part or all of the roast to promote and/or inhibit certain of the chemical reactions which take place in the beans as they are roasted. The temperature of the roasting gas may conveniently be altered during the roast by manually or automatically adjusting the roasting gas temperature responsive controller (not shown) which regulates modulating valve V. As explained above, valve V proportions the roasting gas flowing through return conduit 164 between heat exchanger 96 and bypass conduit 98 so that the gas delivered by booster 100 to reactor vessel 32 will be at the desired temperature. Alternatively, the variation in temperature may be accomplished by directing the roasting gas through a supplemental heat exchanger between heat exchanger 96 and reactor 32 or in any other manner desired.

As mentioned previously, the process just described can be controlled by a manual timed or an automatic mode of operation as well as manually. These are described in parent application No. 425,702.

Referring now to FIGURE 7, as mentioned above, a centrifugal separator 93 is employed to separate chaff from the roasting gas discharged from reactor vessel 32. Chaff separator 93 is connected by a conduit 195 to a chaff collector 196, which must be dumped periodically. Provision is made in installation 30 for accomplishing this manually and automatically. Inasmuch as the dumping cycle normally does not coincide with the roasting cycle (generally the chaff collector need be dumped only once every three or four roasting cycles), the chaff collector operates on a cycle which is independent of that of the main control system and is described in detail in copending application No. 425,702.

As discussed above, in the embodiment of the present invention illustrated diagrammatically in FIGURE 7, roasting gas heating system 38 is of the type in which a liquid heat transfer medium is circulated through a closed loop between a liquid heater and a heat exchanger. This type of system is preferred for many applications of the present invention because the large mass of circulating liquid has a "flywheel" effect and can consequently transfer large quantities of heat to the roasting fluid in a short period. This is highly important because, in the novel fluidized rotating bed of the present invention, heat transfer rates from the roasting fluid to the beans or other product beans processed are extremely high. Therefore, the roasting fluid discharged from the reactor must be rapidly heated many degrees to bring it up to the roasting temperature before it is recirculated through the roasting vessel.

However, for applications of the present invention where the flywheel effect is not so important, a more economically constructed heating unit 258 of the type shown in FIGURE 9, which is capable of both generating and heating the roasting gas, may be employed. Referring now to the just-mentioned figure, heating unit 258 includes a housing 260 surrounding a heating unit 262.

Heating unit 262 has a combustion chamber 264 of the jet tube type provided with a restricted outlet (not shown) from which the main tube 266 of a heat exchange unit 268 extends. At its outer end, main tube 266 is connected by U-shaped tubular members 270 to parallel return tubes 272 which communicate at their opposite ends with combustion chamber 264. Heat exchange unit 268 also includes a plurality of fins 274 fixed to main tube 266 and return tubes 272 in parallel, closely spaced relationship. Additional details of the above-described type of heating unit are disclosed in the United States Patent No. 2,823,659, issued Feb. 18, 1958, to John Fallon for Internally Fired Tubes for Heating Furnaces and Other Purposes, to which reference may be had, if desired.

In operation, a fuel-air mixture is fed to the heating unit's combustion chamber 264 and there burned. The combustion products circulate through the main supply and return tubes 266 and 272 of heat exchange unit 268, heating the latter. After circulating one or more times through the heat exchange unit, the combustion products are discharged through an outlet union 276. The exhaust gases or combustion products thus produced may advantageously be employed as a roasting fluid, particularly for applications where the presence of oxygen in the roasting fluid is undesirable, since they consist primarily of nitrogen, carbon dioxide and a small amount of water vapor.

From discharge union 276, the inert gas passes through a scrubber 278 of conventional construction and then, as in the embodiment of the present invention described previously, is compressed by compressor 280 and delivered to an accumulator 282. From accumulator 282, the roasting gases pass through a conduit 284 into the return conduit 286 connecting reactor 288 to heating unit 258. This gas, together with that discharged from reactor 288, passes through return conduit 286 into the housing 260 of heater 258, where it flows over emitting heat exchange unit 268 and is reheated to roasting temperature. The heated roasting gas is circulated by a booster 290 back into roaster 288.

Heating units of the type illustrated in FIGURE 9 may be operated with the surface temperature of the tubes in heat exchange unit 288 as high as 1675° F. Inasmuch as the roasting gas is only heated to a temperature in the range of 400–440° F. the difference in temperature between the heat source and the exit temperature of the roasting gas from heating unit 258 may be well over 1200° F. Therefore, the arrangement illustrated in FIGURE 9 and just described is capable of transferring heat at a high rate to the roasting gas circulating through the heater.

Except for heating unit 258 and the addition of a scrubber 278, the plant illustrated in FIGURE 9 may be identical to that of FIGURE 7.

As discussed previously in conjunction with the operation of coffee roasting installation 30, beans roasted for the manufacture of instant coffee are preferably cooled under pressure because of the higher yield resulting from pressure cooling. The disadvantage in roasting conventional coffee in this manner is that there is no development of the beans; and the resulting product, therefore, has a high bulk density in comparison to the conventional product. Consequently, coffee cooled under pressure has a lower volume/weight ratio than that cooled at atmospheric pressure, which is disadvantageous in marketing the coffee.

It has now been found, however, that both the advantages of pressure cooling and development of the beans may be obtained by cooling the beans under pressure, slowly reducing the pressure in the cooling vessel to an intermediate pressure (as discussed previously, this pressure may typically be 25–50 p.s.i.g. or as high as 250 p.s.i.g.), and then quickly venting the cooling vessel from the intermediate to atmospheric pressure. This process of cooling provides yields equivalent to those obtained by conventional pressure cooling and, in addition, provides the desired controlled development of the roasted beans discussed above in conjunction with the operation of coffee roasting installation 30.

Pressure cooling may be accomplished in a pressure but is preferably carried out in a separate pressure vessel. Among the reasons for this are that cooling in the roasting vessel slows the process cycle; and, as discussed above, control of moisture content and longer shelf life can be obtained by spraying water on the roasted beans in a separate vessel in the form of a fine mist rather than dumping the added water on the beans in the roasting vessel as is conventionally done.

Pressure cooling in a separate vessel may be accomplished by substituting a pressurized cooler for the rotary cooler 42 of FIGURES 5 and 6 or by roasting and cooling the coffee in installations specifically designed for pressure cooling such as that shown diagrammatically and identified by reference character 308 in FIGURE 10. Referring now to the latter figure, coffee roasting installation 308 includes a charging hopper 310, a reactor 312, a cooler 314, and a discharge hopper 316 arranged one below the other. The beans to be roasted are fed from the source of supply (not shown) through a feed conduit 318 provided with a rotary valve 320 into charging hopper 310. Valve 320 is then rotated to the closed position to isolate the interior of the charging hopper from the ambient atmosphere; and hopper 310 is evacuated through vacuum line 322 to remove the air entering charging hopper 310 with the beans.[8] Valve 323 in line 322 is then closed to isolate charging hopper 310 from the ambient atmosphere.

Charging hopper 310 is then pressurized. In initial runs, this is accomplished by opening a valve 324 in a conduit 326 connecting charging hopper 310 to an accumulator 328 to which inert gas is delivered by a compressor 330 connected between the accumulator and an inert gas generator 331 in the same manner as in installation 30. In succeeding runs, however, the charging hopper is pressurized by opening a valve 332 in a conduit 334 connecting charging hopper 310 to discharge hopper 316 and energizing a transfer compressor 336 in conduit 334 to transfer inert gas from discharge hopper 316 to the charging hopper.[9]

After charging hopper 310 is pressurized with inert gas, valve 324 is closed. Reactor 312 is then pressurized by opening a valve 338 in a conduit 339 connecting the reactor to accumulator 328. After roasting pressure is reached, valve 338 is closed. Thereafter, the beans or other product to be roasted are transferred from charging hopper 310 to reactor 312 by opening a valve 340 in a transfer conduit 341 connecting the charging hopper and reactor. Valves 343 and 344 in roasting gas supply and return conduits 345 and 346 are then opened to effect a circulation of the roasting fluid through the reactor.

Reactor 312 may be identical to the reactor 32 discussed above; and, in installation 308, the coffee beans are roasted in the same manner as in reactor 32, the roasting gas being circulated by a booster 347 from a heater 348, where the roasting gas is heated or reheated, through supply conduit 345 into the reactor. From reactor 312, the roasting gas is recirculated through return conduit 346 to the heater. Roasting installation 308 thus has a closed circulation system for the roasting gas similar to the closed loop 40 of plant 30. This loop is preferably provided with the same bypass, flow regulating, and other novel features of loop 40 for optimum performance of reactor 312 and is connected to accumulator 328 by conduit 349.

Like reactor 32, reactor 312 may be vented during the roast with the advantages described above. This is accomplished by closing the valves 343 and 344 in supply and return conduits 345 and 346 to stop the circulation of the roasting gas and opening a valve 350 in a vent conduit 352 to vent the reactor vessel. After venting, valve 350 is closed and valves 343 and 344 reopened to resume flow of the roasting gas through reactor 312.

After the beans have been roasted for the desired period or to the desired color or temperature, valves 343 and 344 are closed, stopping the circulation of the roasting gas; and the cooler is pressurized to the desired cooling pressure (which is preferably generally equal to the roasting pressure) by opening a valve 354 in a conduit 356 connecting cooler 314 to accumulator 328. Dump valve 358 is then opened, permitting the roasting beans to flow from reactor 312 to cooler 314 through transfer conduit 360. Valve 354 is then closed, which isolates reactor 312 from cooler 314.

Referring now to FIGURE 10, the same inert gas employed to roast the beans may also be used to cool them by connecting accumulator 328 through a conduit 362 to a cooling system 364 which includes a booster or circulator 366, supply and return conduits 368 and 370 connected to cooler 314, and a heat exchanger 371.

Circulation of the cooling fluid is initiated by opening valves 372 and 374 in supply and return conduits 368 and 370, permitting booster 366 to circulate the inert gas from conduit 362 through supply circuit 368 into and upwardly through the beans in cooler 314. From cooler 314, the cooling gas flows through return conduit 370 into heat exchanger 371, where the heated cooling gas is cooled.[10]

At the same time that or after the flow of cooling gas through cooler 314 is initiated, slow vent valve 376 is opened to slowly vent cooler 314 through vent conduit 378 to an intermediate pressure, typically on the order of 25–50 p.s.i.g. When the intermediate pressure is reached, quick vent valve 380 is opened, rapidly venting cooler 314 from the intermediate to atmospheric pressure through vent conduit 382. The vent valves are closed when the pressure in cooler 314 reaches atmospheric to prevent air from entering the cooler.

Cooler 314 is preferably provided with a spray system (not shown) like that employed in rotary cooler 42. After the circulated gas has cooled the beans in cooler 314 to a sufficiently low temperature to prevent water

---

[8] Alternatively, charging hopper 310 may be purged of air by circulating a suitable gas through it. Or, for applications where the presence of air is not undesirable or even beneficial, the purging step may be omitted.

[9] In this and the preferred embodiment of the present invention, the inert gas generator may be replaced with a gas turbine, if desired. The turbine may be employed to drive the compressors, pumps, and similar equipment and its exhaust may be employed as the treating fluid and for cooling as it is almost exclusively an inert mixture of nitrogen, carbon dioxide, and water vapor. The heat in the exhaust gases can also be extracted and employed to heat the treating fluid if the exhaust gases from the turbine are not employed as the roasting fluid.

[10] If desired, cooler 314 may be identical to reactor 312; and the cooling fluid may be circulated therethrough in the manner described previously to produce a fluidized rotating bed. This mode of cooling will uniformly and rapidly cool the hot treated solids discharged into the cooler from reactor 312.

from flashing, water may be sprayed on the beans in the form of a fine mist as described above to arrest the roast and quickly complete the cooling and to control the moisture content of the roasted beans.

After the beans have cooled, a valve 384 in a transfer conduit 386 between cooler 314 and discharge hopper 316 is opened, permitting the cooled beans to flow by gravity from cooler 314 into the discharge hopper, which, if desired, may be pressurized by opening a valve 388 in a conduit 390 connecting discharge hopper 316 to accumulator 328, or, preferably, by transferring the fluid from charging hopper 310 to it by transfer compressor 336.

Valve 384 is then closed, valve 332 opened, and transfer compressor 336 started to transfer the inert gas from the discharge hopper back to charging hopper 310 for the purposes explained above. Valve 332 is next closed and a valve 392 opened to permit the roasted and cooled beans to flow from discharge hopper 316 through conduit 394 onto a suitable conveyor (not shown).

It will be apparent from the foregoing and from FIGURE 10 that each of the four pressure vessels 310, 312, 314, and 316 can be isolated from each other and from the ambient atmosphere. This is an important feature of this embodiment of the present invention as it materially speeds the process cycle. For example, while charging hopper 310 is being loaded with a first batch of beans, a second batch can be roasted in reactor 312, a third batch cooled in cooler 314, and a fourth batch discharged from discharge hopper 316. Thus, the time lost in transferring a batch of beans from one vessel to another in roasting installation 308 is minimized with a consequent reduction in process cost.

In addition to the spray system mentioned previously, roasting installation 308 will also preferably be provided with part or all of the novel control and other features described above in conjunction with roasting system 30. The foregoing have been omitted from the illustration of system 308 in FIGURE 10 for the sake of clarity and to avoid unnecessary repetition.

Many modifications may be made in the illustrated embodiments of the present invention in addition to those discussed above. To the extent that such modifications are not expressly excluded from the appended claims, they are fully intended to be covered therein. As discussed above and from the foregoing description of exemplary applications of the present invention, it will also be readily apparent to those skilled in the arts to which the present invention pertains that its principles can be used for applications other than those specifically mentioned. All such applications of the present invention and processes employing its principles are also intended to be covered by the appended claims unless expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of roasting coffee beans and similar particulate solids in a vessel having a bed of the solids to be roasted therein, comprising the steps of:
   (a) pressurizing the roasting vessel to a pressure sufficiently high to reduce losses in yield and not below about 130–150 p.s.i.g.;
   (b) roasting said solids by effecting a continuous flow of heated fluid through said bed;
   (c) before the roasting of said solids is completed, concurrently interrupting the roasting process by terminating the flow of heated fluid into the bed of solids and reducing the pressure in said vessel to a sufficiently low value to volatilize selected undesirable constituents in said solids and thereby effect the removel of said constitutents from the solids; and
   (d) thereafter repressurizing said vessel and resuming the flow of roasting fluid into said bed until the solids are roasted.

2. The method of claim 1, wherein the flow of heated fluid through the bed of solids is continued for a total of about 4½–7¾ minutes.

3. The method of claim 1, wherein the flow of heated fluid through the bed of solids is continued until the temperature of said solids is in the range of about 392–408° F.

4. The method of claim 1, wherein the roasting vessel is pressurized to a pressure on the order of 130–150 p.s.i.

5. The method of claim 1, together with the steps of:
   (a) discharging the roasted solids from the roasting vessel into a cooler;
   (b) agitating said solids in said cooler; and
   (c) while said solids are being agitated, spraying them with a mist of water to quench the roast and to control their moisture content.

6. A method of roasting coffee beans and similar particulate solids under pressure in a vessel having a bed of the solids to be roasted therein, comprising the steps of:
   (a) pressurizing the interior of said vessel to a pressure above atmospheric but below a preselected roasting pressure sufficiently high to reduce the loss in yield which would result from roasting said solids at atmospheric pressure;
   (b) isolating the interior of said vessel from the surrounding atmosphere to maintain the differential in pressure between the interior of the vessel and the surrounding atmosphere;
   (c) effecting a continuous flow of a heated fluid through said bed to evolve a sufficient volume of volatiles from said solids to increase the pressure in the isolated interior of the reaction vessel to said preselected roasting pressure;
   (d) continuing the flow of heated fluid through said bed to roast said solids; and
   (e) establishing a path of fluid communication between the interior of the reaction vessel and the surrounding atmosphere for automatically venting the interior of the vessel upon the presence of a pressure greater than said preselected pressure in said vessel to prevent the pressure therein from rising above said selected pressure.

7. A method of roasting coffee beans and similar particulate solids under pressure in a vessel having a bed of the solids to be roasted therein, comprising the steps of:
   (a) pressurizing said vessel to and maintaining it substantially at a pressure not exceeding a preselected roasting pressure which is sufficiently high to reduce the loss in yield which would result from roasting said solids at atmospheric pressure;
   (b) effecting a flow of a heated roasting fluid through said bed to roast the solids, said flow of heated fluid being terminated when the solids are roasted; and thereafter
   (c) producing a controlled expansion of and consequent reduction in the bulk density of the roasted solids by:
      (1) reducing the pressure on said solids to an intermediate pressure which is well below the pressure at which the solids are roasted but is substantially above atmospheric pressure at a sufficiently slow rate to prevent an excessive development of said solids and consequent reduction in the yield from the roasting process; and then (d) rapidly reducing the pressure on said solids from said intermediate pressure to atmospheric pressure to insure the proper development of said solids.

8. The method of claim 7, wherein:
(a) the roasting fluid is heated to a temperature of about 400–445° F.;
(b) the reaction vessel is maintained at a pressure of about 130–150 p.s.i. substantially throughout the roasting of the solids; and
(c) the intermediate pressure to which the pressure in the vessel is reduced is about 25–50 p.s.i.

9. The method of claim 7, wherein:
(a) the roasted solids are discharged from the vessel in which they are roasted into a cooler pressurized to a pressure substantially above atmospheric;
(b) the solids are cooled by circulating a fluid through said cooler; and
(c) the pressure on said solids is reduced while they are being cooled by:
(d) slowly reducing the pressure in said cooler from said preselected pressure to said intermediate pressure; and
(e) thereafter quickly venting said cooler from said intermediate pressure to atmospheric pressure.

10. A method of roasting coffee beans and similar particulate solids, comprising the steps of:
(a) effecting a flow of a heated fluid through said solids;
(b) recirculating said fluid through said solids; and
(c) after said fluid exits from but before it is is recirculated through the solids, cooling at least a part of said fluid to a temperature above the boiling point of water to condense and facilitate the removal from said fluid of high boiling point volatiles evolved from said solids and carried therefrom by said fluid without condensing water vapor evolved from said solids;
(d) the fluid being heated to a sufficiently high temperature and the flow of the fluid through the solids being continued for a sufficiently long period to roast said solids.

11. The method of claim 10, together with the step of reheating said fluid after it has been cooled to condense volatiles therefrom.

12. The method of claim 6, together with the steps of:
(a) discharging the roasted solids into a cooler;
(b) agitating said solids in said cooler; and
(c) while said solids are being agitated, spraying them with a mist of water to quench the roast and to control their moisture content.

13. The method of claim 6, together with the steps of:
(a) generating the heated fluid by the controlled combustion of a fuel-air mixture in an inert gas generator to produce a substantially oxygen-free fluid of preselected composition;
(b) transferring the fluid thus generated from said inert gas generator to a fluid heater; and
(c) heating the fluid to a preselected temperature sufficiently high to roast said solids; and
(d) then effecting the flow of the fluid into the bed of solids to heat said solids.

14. The method of claim 6, together with the steps of, before the solids are roasted:
(a) isolating the interior of the vessel containing the bed of solids to be roasted from the ambient atmosphere; and
(b) thereafter removing the air from the interior of said vessel by effecting a flow of the fluid by which the solids are to be roasted through the vessel until the interior thereof is substantially free of all gases but said fluid.

15. The method of claim 13, wherein said fluid is heated by directing it over a heat exchanger incorporated in the fluid heater, whereby said fluid is heated by convection.

16. The method of claim 6:
(a) wherein said solids are roasted at a pressure substantially above atmospheric pressure; and
(b) including the step of cooling said solids at superatmospheric pressure.

17. The method of claim 6, together with the steps of:
(a) recirculating the fluid used to roast said solids;
(b) after said fluid exits from but before it is recirculated through said solids, removing therefrom at least a part of the volatiles evolved from said solids and carried therefrom by said fluid.

18. The method of claim 17, wherein said fluid is scrubbed to remove volatiles evolved from the solids and carried therefrom by said fluid.

19. The method of claim 6, wherein said spray is continued for about 8–10 seconds and said water is supplied at a rate of at least about 1.0 gallon per 100 pounds of solids.

References Cited

UNITED STATES PATENTS

| | | | |
|---|---|---|---|
| 1,237,931 | 8/1917 | Malvezin | 99—68 |
| 2,009,945 | 11/1937 | Simpson | 99—68 |
| 2,212,120 | 8/1940 | Kneale et al. | 99—68 |
| 2,513,813 | 7/1950 | Milleville | 99—68 XR |
| 2,632,706 | 3/1953 | Montgomery | 99—68 |
| 2,639,133 | 5/1953 | Clary | 99—68 |
| 2,716,936 | 9/1955 | Kopf | 99—68 XR |
| 2,750,680 | 6/1956 | Houdry et al. | 34—36 X |
| 2,859,116 | 11/1958 | Heimbs et al. | 99—68 |
| 2,975,526 | 3/1961 | Heimbs et al. | 34—57 |

A. LOUIS MONACELL, *Primary Examiner.*

MAURICE W. GREENSTEIN, *Assistant Examiner.*